US005895790A

United States Patent [19]

Good

[11] Patent Number: 5,895,790
[45] Date of Patent: *Apr. 20, 1999

[54] THERMOSETTING WIDE RANGE POLYMER BLENDS

[76] Inventor: Elmer Good, 5744 Nutwood Cir., Simi Valley, Calif. 93063

[*] Notice: This patent issued on a continued prosecution application filed under 37 CFR 1.53(d), and is subject to the twenty year patent term provisions of 35 U.S.C. 154(a)(2).

[21] Appl. No.: 08/572,531

[22] Filed: Dec. 14, 1995

Related U.S. Application Data

[63] Continuation-in-part of application No. 08/403,495, Mar. 14, 1995, abandoned.

[51] Int. Cl.⁶ .................. C08J 11/04; C08L 23/06
[52] U.S. Cl. .................. 521/47; 521/46; 525/194
[58] Field of Search .................. 525/194; 521/47, 521/46

[56] References Cited

U.S. PATENT DOCUMENTS

| | | | |
|---|---|---|---|
| 3,806,562 | 4/1974 | Lamort et al. | |
| 4,013,616 | 3/1977 | Wallace . | |
| 4,123,584 | 10/1978 | Brewton | 521/47 |
| 4,206,260 | 6/1980 | McMahon | 428/379 |
| 4,255,372 | 3/1981 | Kuhnel et al. | |
| 4,789,597 | 12/1988 | Gupta | 428/467 |
| 4,808,665 | 2/1989 | Patel | 525/194 |

FOREIGN PATENT DOCUMENTS

| | | |
|---|---|---|
| 517175 | 12/1992 | European Pat. Off. |
| 3239526 | 4/1984 | Germany . |
| 4102235 | 7/1992 | Germany . |
| 4105285 | 8/1992 | Germany . |
| 56-106939 | 8/1981 | Japan . |
| 56-146754 | 11/1981 | Japan . |
| 031722 | 2/1993 | Japan . |
| 068714 | 3/1994 | Japan . |
| 2177706 | 1/1987 | United Kingdom . |

OTHER PUBLICATIONS

Modern Plastics Encyclopedia, Dec. 1992, McGraw–Hill, vol. 69, No. 13, pp. 33–63.
"Crosslinking and Scission in Polymers", ed. Guven, pp. 1–12, Kluwer Acad. Publ., 1988.
"The go–betweens", The Economist, eds., p. 109, Oct. 1, 1990.
Draiswerke, Inc. brochure, 1994, "High Speed Thermokinetic Mixing, Compounding and Fluxing", 3 pages.
Lex Technologies, Inc. brochure, 1995, "Creating Opportunities with Advanced Composite...", 14 pages.
"Crosslinking PE Can Be Recycled", Technology News, Jun. 1992, pp. 43–44.
"Recycling Cross–Linked Polyethylene", Good, Pres. to Association of Rotational Molders, Oct. 7, 1991, 8 pages.

*Primary Examiner*—David Buttner

[57] ABSTRACT

The present invention economically recovers wide range polymer blends and waste thermoset material. A first method of thermosetting a wide range polymer blend forms a homogenous and adaptable first method material. This material has a melt index of zero and a relatively predictable density. Very high levels of fibrous non-polymers may be added to the first method material.

14 Claims, No Drawings

5,895,790

THERMOSETTING WIDE RANGE POLYMER BLENDS

This is a continuation-in-part of application Ser. No. 08/403,495 filed Mar. 14, 1995 now abandoned.

FIELD OF TECHNOLOGY

The present invention relates to the field of treating several miscible and immiscible types of polymers to make a usable product. The present invention especially relates to the advantageous treatment of such polymers that occur in wide range blends typically recovered from municipal and industrial waste streams.

BACKGROUND

The editors of "Mechanical Engineering" (Feb. 1992, p. 20) report that "Unsorted plastic waste poses a difficult problem for recyclers, because the polymer materials recovered from these heterogeneous batches of plastics are too low-quality to reuse in high-performance products. For real utility, the various polymer compositions must be separated into pure form." The article then describes two methods of degrading shredded plastics and causing chemical separation into monomers by gas or solvent. These are the alternatives to preliminary extensive physical separation of polymer resin products presented by two prestigious groups, the Rensselaer Polytechnic Institute and the Battelle Memorial Institute.

The Modern Plastics Encyclopedia (R. Martino, ed., Vol. 69, No. 13, December 1992, McGraw-Hill, hereafter referred to as MPE '92) presented an industry overview of plastic recycling techniques and the scope of the recycling problem in the U.S., Japan, and Europe (pp. 33–63, several authors). This exhaustive overview, divided into two sections, "Plastics Solid-Waste Advisory" and "Recycling Technology Update", is part of a product guide for plastics and additives made by the world's major manufacturers.

Information in this type of publication has been closely examined and well-researched by research and industry experts. On page 33, R. Lowman states that, "Plastics were immediately branded as a waste-management villain, largely on the basis of non-degradability even though modern sanitary landfills are designed to retard biodegradation. According to the U.S. Environmental Protection Agency's (EPA) report on characteristics of the municipal solid-waste (MSW) stream, in 1988 plastics accounted for 19.9% vs. 34.1% for paper, universally recognized as a biodegradable material." The table entitled "Plastics sales recycled by selected resins" on page 33 reports that in 1991 only 5% of about 12.5 billion pounds of PET, HDPE, PVC, LDPE, LLDPE, PP and PS was recycled. The rest ended up in dumps and landfills, along with the hundreds of other polymers produced to meet the needs of industry and consumers. The evolution of new plastics to more efficiently meet those needs means that few generalizations can be made about any class of polymers for any length of time. Recycling methods must incorporate the ability to process the diverse formulations of the past, the present, and the future. Listings of engineering and consumer polymers and their additives are typically presented in several volumes of thick books with small type.

In MPE '92, roughly half the pages in the Recycling Technology Update describe systems of physical separation of polymer products to isolate specific polymer resins. Relatively high purity polymer resins must be produced by the separation processes before recycling can be contemplated. Note that on page 49, 8 of the 11 products with post-consumer resins contain no more than 25% of such resins, even though high purity separation has been performed.

On page 54 of MPE '92 begins a section entitled "Chemical Recycling". Chemical or tertiary recycling is a recent innovation, i.e. ". . . was a development welcomed by both suppliers and consumers in 1992." (p. 54). But it then reports that ". . . Existing reclaim and re-use methods are not capable of handling complex waste streams that include wire and cable, medical disposables, blended and compounded plastics, and auto-shredder residues. Other factors influencing the move to alternative recycling procedures have been the quality and performance of recycled plastics." (p. 54) Consistent with the article from Mechanical Engineering above, this section of MPE '92 describes several routes to get crude or pure monomer gases and liquids from reclaimed plastics. The methods include pyrolysis or hydrolysis brought about through high temperature or chemical treatment.

In "Polymer Chemistry" (M. Stevens, Oxford Press, 1990) on page 101 is a Table 3.6 entitled "Types of polyblends" that lists eight technologies to prepare polyblends. Polyblends are defined on page 100 as ". . . any physical mixture of two or more different polymers or copolymers that are not linked by covalent bonds. " In addition to the technologies of Table 3.6, topological bonding, interfacial compatiblizers, and natural affinity interphase bonding are described on page 104 as ways to prepare polyblends. For a compatiblizer polyblend such as ABS (acrylonitrile-butadiene-styrene), the styrene-butadiene and the styrene-acrylonitrile copolymers develop into different crystalline regions held together by grafts. "The number of grafts is small, but is sufficient to provide the necessary interfacial adhesion. ABS polymers are widely used as engineering plastics." (p. 104) Thus, such an important part of plastics technology is maintained on the strength of only a few grafts "to provide the necessary interfacial adhesion".

Polymer Chemistry describes methods for chemical and physical crosslinking on pages 98–100. "Elastomers are characterized by having a very low crosslink density—about one crosslink per 100 monomer units—together with highly flexible main chains to allow large deformations. Elastomeric behavior depends, of course, on polymer structure and crosslink density; but it also depends on morphology and molecular weight." (p. 99). But, in contrast, ". . . Very high crosslink densities lead to embrittlement." (p. 99) Physical crosslinking involves reversible methods of forming hard, solid objects, as opposed to the results obtained with covalently crosslinked resins. "Once crosslinked, a polymer cannot be dissolved or molded." (P. 99)

In "Crosslinking and Scission in Polymers" (O. Guven, ed., Kluwer Academic Publishers, 1990) on page 1, in the article entitled "Molecular Weight Changes and Network Formation by Scission and Crosslinking" (pp. 1–13), A. Charlesby states, "Main chain scission of long chain polymers (degradation . . . ) is to be distinguished from depolymerization . . . (and) involve a random distribution along molecular length, so that whatever the initial molecular weight distribution, it rapidly tends towards a random molecular weight distribution . . ." And on page 2, he adds that, "Fracture of the main chain leaves two radicals at the side of the scission. Which chemical changes occur to stabilize these highly reactive ends?"

In the Charlesby article, crosslinking is discussed on pages 4–5—"The effect of such bonds (crosslinks) depends not only on their density and on the chemical structure of the individual bonds, or even on the molecular mobility and morphology, but also on the distribution of the crosslinks . . . Many of these physical properties dependent on crosslink density are also influenced by chain entanglements, which can behave for limited periods as equivalent to permanent crosslinks. The mechanical behavior of a crosslinked and entangled network will be a composite of permanent elongation plus flow, the latter being due largely to the changes in entanglements under stress."

U.S. Pat. No. 4,013,616 (Wallace '616) describes using ". . . an unpyrolyzed, unincinerated, comminuted fraction from a front end recovery system including glass, cellulose and its derivatives, inorganic oxides, and mixed polymer resins." (col. 2, ll. 6–9) as a filler for ". . . flowable, castable thermoplastic or elastomeric polymer." (col. 2, ll. 5–6). A glass-rich fraction must be used to overcome inherent incompatibility of mixed polymers. Wallace '616 states that, "One reason why the shredded polymer-rich residue from a front-end system would form a poor material by itself is that it contains a number of mixed polymers which are incompatible with each other, for example, polyethylene and polyvinyl chloride. When these polymers are melt blended, the product appears striated or layered, is fibrillated and has inferior physical properties and poor structural integrity. When blends of these polymers are mixed without segregation, they have poor elongation properties and are cheesy and brittle." (col. 1, ll. 44–54). The solution offered by Wallace '616 is to dilute incompatible filler and binding resin with ground glass so that ". . . it can form an interface with the binder of sufficient length to provide a significant weakened fault line in the composition." (col. 2, ll. 35–36) In other words, the solution is dilution instead of establishing compatibility. The apparent amounts of mixed polymeric resin used in the final product appears to be no higher than about 2–8 weight percent with virgin resin binder at some higher percentage. There appears to be no general indication that higher levels of mixed polymeric resin would be achievable by prior art methods.

German Patent Application 4102235—A requires that a floatable portion of domestic waste be further separated to remove all polymers but thermoplastic polyolefins, such that a thermoplastic elastomer is made therefrom. There is no teaching that any fiber or mineral filler be used in the final product. There is no teaching that extruder processing is used. A natural rubber must be used with dynamic vulcanization to produce a usable product. Both German Patent Application 4102235—A and Wallace '616 require specific separations of the waste portions to be used. A floatable portion of waste as described in those references is not amenable to use without specific direction concerning its separation and subsequent processing. One reference process produces a glass and fiber filled product with low mixed resin content, while the other reference process produces a thermoplastic elastomer with no contamination from other polymers permitted. This combination of information would hardly lead the skilled person to select a general floatable portion, of which Wallace '616 identifies at least 3 different portions obtainable from floatation, as a standard commodity in combining with other polymers.

An abstract of a Japanese patent publication, JP 5 6106-939 (25.08.81), to Nisshin Kogyo KK (Kogyo '939) discloses a "low fluidity" and "crosslinked" polyethylene. "Low fluidity" polyethylene must be distinguished from "no fluidity" polyethylene. Thermoset material, by definition, has no fluidity, is not flowable and is generally known by its ability to recover its original shape after heating, compression or deformation. "Low fluidity" at "low temperature", as used in Kogyo '939, describes polyethylene not completely thermoset—either the melt index of the material is not zero or it contains substantial amounts of polyethylene with a melt index above zero. The essential nature of a thermoset material is that of a single, large macromolecule which will not become fluidized unless substantial breaking of its covalent bonds is effected. The disclosure of Kogyo '939 is insufficient to discern whether a useful product is made or how to proceed to obtain the indicated product. The abstract does not inform the skilled person of the "low" temperature range, relative amounts of polyethylene (I) and polyolefin (II) and the length of the "short" retention time. Kogyo '939 is an invitation to expend considerable time and experimentation in determining how to actually use the material in injection molding, blow molding or rotomolding. Polyolefin (II)'s are used in the alternate "or" for individual mixing with the "low fluidity", "crosslinked", waste polyethylene, so that only a mixture of "low fluidity" polyethylene with polyethylene or polypropylene is mentioned. The broadest blend of polymers described in Kogyo '939 is that of polyethylene and polypropylene, a well know composite in the prior art.

The editors of the Economist (Oct. 1, 1994, p. 109) in an article entitled "The go-betweens" state that, "Plastics are prime candidates for recycling, but that often means making do with a mixture of different polymers, some of which do not fit well together well. These re-melted mixes have a tendency to harden in brittle, weak solids with unpredictable properties." They then describe a recent polyblending innovation using polystyrene-enhanced PEA and PMMA in a new alloy-type polymer. The attraction of the PS portions permit separate crystalline regions of PEA and PMMA to interfacially mesh and bond to create a new polymer with properties that would have been unpredictable from the properties of either PEA, PMMA or their PS-enhanced derivatives. There is no indication that the enhancing moieties, the potential polyblending candidates, or the properties of the resulting polyblend could be further predicted from the innovation described in this reference.

As noted above, the potential for reclaiming plastics from landfills means that the outdated formulations of the past, the bewildering array of additive-enhanced formulations of the present, and the certainty that plastics will continue to become more complex in the future means that a process with broader application that those of the prior art must be found to improve the profitability of such reclaiming.

An abstract of a German patent publication, DE 3239-526-A (26.04.84) to RXS Schrumpftechnik (RXS '526) describes a "crosslinked" polymer as being 90 percent or less of "granules" used in a mixture in which those "granules" will comprise 50 percent or less of the mixture. The "granules" will not have thermoset properties whether or not the "crosslinked" polymer is actually thermoset. Addition of 10–90 percent of non-crosslinked polymer will give the mixture a flowable quality uncharacteristic of thermosets and necessarily infers some non-standard process step to obtain those "granules". The origin or processing of the 10–90 percent non-crosslinked polymer in relation to the "crosslinked" polymer is not disclosed in RXS '526. It would cause the skilled person to refrain from using the process of RXS '526 as a teaching until the nature of that non-crosslinked polymer and the processing steps to get it were disclosed. In addition, RXS '526 merely indicates that a "non crosslinked polymer" is suitable for mixture with the "crosslinked polymer". Although those skilled in the art of polymers have some ability to discern direction from the way language is used in a reference, the failure of RXS '526 to tell what a "non crosslinked polymer" is at the point of asserted novelty renders the reference of little use as a teaching. In RXS '526, the "crosslinked" polymer will thus always be less than or equal to 45 percent of the mixture.

In addition, in RXS '526, "crosslinked" polymer must be mixed with "non crosslinked polymer" granules, injection molded and then irradiated to cause sufficient crosslinking so that the properties of the mixture are the same as those of the "non crosslinked polymer" material. A usable product is obtained only as a fully crosslinked (by irradiation) polymer. As demonstrated by the above prior art, incompatibility of polymer resins mixed by melting generally results in a useless material. The wide range of formulations of additive-enhanced products from even a single type of polymer resin mean that such information as presented in RXS '526 is not useful other than to invite a fairly long and expensive course of experimentation to establish compatibility of crosslinked polyolefin waste with whatever might be meant by the term "non crosslinked polymer". There is no description in RXS '526 concerning crosslinked polyolefin waste. Virtually every polyolefin resin is crosslinked to some degree. Crystalline, semi-crystalline and amorphous structures are found in thermoplastics, elastomerics and thermosets. Without indication concerning the degree of crosslinking and at least the category of crosslinked polymer resin, RXS '526 leads the skilled person to contemplate undue experimentation to establish its usefulness.

U.S. Pat. No. 4,255,372 (Kuhnel et al '372) describes making a "... 'homogenous foamed article'... understood to mean a foamed article which again exhibits closed cells of uniform structure." (col. 1, ll. 45–47). A crosslinking agent is used on foam scraps such that the "... bulk density of the shaped article produced from the foam scraps, though, is increased over that of the original foam material. One explanation for the invention could be seen in that there are residues of blowing agent and residues of crosslinking agent in the foam scraps stemming from the original manufacturing process, which agents have not as yet been decomposed and are activated during the renewed expanding and crosslinking process." (col. 1, ll. 52–60) "Crosslinked polyolefin foam chips" (col. 5, ll. 48) are described as being processed with pure high pressure polyethylene with a melt index of 4 g./10 min. or pure ethylene-vinyl acetate copolymers at less than 25 weight percent foam chips. A first mixing in a hot mixer, rolling mill or extruder must take place at less than the decomposition temperature of a crosslinking agent. Only polyolefin foam scraps containing elastomer or synthetic resin and having been made with a peroxide crosslinking agent and a blowing agent can by processed by the method of this patent.

U.S. Pat. No. 3,806,562 (Lamort et al '562) appropriately states that a "... difficulty in the reuse of scrap plastics arises from the fact that these latter, like any other material being recovered, originated from batches of variable composition from which is necessary to obtain a product of substantially constant characteristics." (col. 1, ll. 62–66) The process of Lamort et al '562 uses a mixture of low softening temperature thermoplastic polymer resin and other "non-softened particles" (col. 2, ll. 9–10) in a melt blended paste, into which mineral fillers could also be added. There are no specific examples of the low softening point polymer resins to be used. There is no mention or indication that compatibilizing, as defined in the selection from Polymer Chemistry, has occurred, nor is there any teaching concerning the melt blending of dissimilar polymer resins, as warned of in Wallace '616. Mere dilution of low softening point thermoplastic polymer resin with non-reactive, non-polymer particles may be effective up to the point that mechanical integrity of the crystalline structure is affected. But that is not true of particles of polymer resins—all such particles have strong or weak affinities and/or repulsions for other polymer resins. Even though greatly diluted, certain end groups and a small number of grafts and branches of a polymer molecule dramatically influence its compatibility with other melt blended polymer resins.

U.S. Pat. No. 4,098,649 (Redker '649) describes a method for volatilizing organic matter, i.e. paper, wood, plastic and vegetable matter, in the absence of oxygen. This is a continuous destructive distillation method analogous to pyrolytic monomer recovery and is not directed to any melt blending or compatibilization of polymer resins.

Two publications disclose using homogenous, 0.962 density HDPE with a narrow melt index (5–8) ground to from 35 to 100 mesh in a melt blend with virgin HDPE for compression molding and injection molding. The two publications are (1) a paper titled "Recycling Cross-Linked Polyethylene" by Elmer Good, presented to the Association of Rotational Molders on Oct. 7, 1991 and (2) a report of that presentation in Technology News for June 1992, pp. 43–44, by J. Ogando. The Good paper discloses that the above previously processed (blow molded) HDPE was "crosslinked". Prior art methods of crosslinking HDPE include rotomolding or reaction molding with a crosslinking agent, although there is no disclosure concerning either the process or the degree of crosslinking achieved for "crosslinked" material. It is further disclosed that the homogenous, "crosslinked" material was used for injection molding and rotomolding when combined with 65–75 weight percent virgin HDPE with closely matching densities and melt indices of the blowmolded HDPE before it was "crosslinked". It was an essential requirement of the process in the Good paper that the "crosslinked" material be pulverized to between 35 and 100 mesh at considerable cost before mixing with the virgin HDPE.

The Ogando paper shows a microphotograph (improperly labeled as an injection molded product) of the blend of the "crosslinked" HDPE with the virgin, density-matched HDPE in a rotomolded product. Proper rotomolding processing will produce a HDPE product whose melt index is zero, i.e., a thermoset. It appears that the photograph in the Ogando article shows a product using the Gyron compound, which in the Good paper is described as being used only in rotomolded samples.

For the Good and Ogando papers, it is critical to note that in none of the samples where HDPE is "recycled" was "scrap" from rotomolding or reaction molding used. The assertion of the Good paper that "scrap" from the operations that typically produce unusable, thermoset scrap, i.e., rotomolding and reaction molding, could be injection or rotomolded was not demonstrated. It was asserted in the Good paper that 0.962 HDPE solely from blow molded products with a low and narrow melt index range (typical of blow molding polymers) with an undisclosed degree of crosslinking would blend with virgin HDPE with a matching density and melt index range for use in injection molding or rotomolding.

The results reported by the Good paper appear to be consistent with the requirements (1) in RXS '526 that "granules" that will later be used with "non crosslinked polymer granules" have less than 90 percent of some undescribed "crosslinked" polyolefin and (2) in Kogyo '939 that (in two places in the short abstract) "low fluidity" polyethylene which has been to some degree "crosslinked" can be extruded with LDPE, HDPE or polypropylene at a low temperature. The sum of the teachings of the prior art contain no suggestion that a material which is thermoset can be blended with a thermoplastic without first melt blending a non-thermoset polymer with it unless the mixture is diluted with mineral fillers or fibers.

In addition, the consistent teaching of the prior art in U.S. Pat. No. 5,215,695, German Patent Application 4105285-A, and U.S. Pat. No. 4,013,616 is that when thermosets are mixed with thermoplastics, a mineral filler or fiber must be added with it. The person making skilled choices in selection of processes for using thermosets with thermoplastics is nowhere in the prior art clearly given a suggestion to use thermosets with thermoplastics unless something else is added with them. Instead, in each case in the prior art, the "crosslinked" material was in some sense diluted with thermoplastic or was not clearly thermoset prior to mixing with thermoplastics, or the "crosslinked" material was diluted with an inert filler such as mineral filler or fibers during the melt blending process.

U.S. Pat. No. 5,215,695 describes shredding a cellulose-backed laminate whose aminoplastic resins are not fully condensed to form a laminate scrap powder mixture. The aminoplastic resins are not thermoset before they are powdered. The aminoplastic resins do not become part of a thermoset product. The aminoplastic resins become further condensed upon mixing with thermoplastic, although it is not possible to discern whether the aminoplastic resin portion becomes thermoset in the final product. The cellulose portion of the scrap powder is about 63 weight percent. Phenolic and melamine resins make up the balance. A set of thermoplastic polymers described in col. 4, ll.9-14 are added to an extruder where additional condensation takes place. An extruder is described as a preferable place for mixing and melting the resins for this process of this patent. There is no indication that mixing and melting resins other than those described in the patent for the process described therein would be effective or useful for those other processes or resins. Only a single, short sentence in the patent refers to the operation of the extruder specifically. The requirement of a cellulose content of at least about 30% in the final blend indicates that the teaching of using an extruder for mixing and melting in the art is very limited.

German Patent Application 4102235-A describes using a mixer for thermoplastics, thermosets and "particularly" mineral and natural fibers prior to feeding to a heated extruder. Consistent with the teaching of U.S. Pat. No. 5,215,695, the extruder is used only in conjunction with high fiber content in relation to the polymer component. It nowhere indicates other uses of the extruder. Used car parts are proposed to be "disintegrated" and then the particles are separated by origin into separate bins, i.e., "according the car component being utilized". The use of each car component is not on an unsorted basis and is effectively controlled by variable mixing of portions from four different bins. German Patent Application 4102235-A and U.S. Pat. No. 5,215,695 teach careful control over materials being fed to a heated extruder. There is no generalized invitation to use heated extruders to perform any sort of polymer blending, whatever the type of polymer or product to be made.

SUMMARY OF THE INVENTION

The present invention includes a first method and a second method. The first method produces a thermoset material. The second method produces a product with the thermoset material of the first method and a thermoplastic resin.

The first method is a method for crosslinking to at least the point of being thermoset mixtures of mainly thermoplastic polymers that are compatible in melt blends (miscible), as well as for those polymers that are incompatible (that separate or tend to segregate into different phases). Homogenous thermoplastic polyolefins may also be crosslinked to the point of being thermoset according to the first method. It is an advantage over the prior art to combine immiscible polymers in the thermosetting process of the first method to compatiblize them.

The first method comprises adding a crosslinking agent in low quantities to a mainly thermoplastic mixture. That mainly thermoplastic mixture is then melt blended in (1) a heated extruder at over about 250° F. for over about 30 seconds or (2) a thermokinetic mixing device without shell heating, wherein the polymers achieve blend temperatures from 200–620° F. in less than about 20 seconds. The resulting melt blend is thermoset, i.e., with a melt index of zero. The crosslink density may increase for polymers that have a melt index of zero, where, for example, the crosslink density is measured by analysis of gel content. The objects of the present invention are achieved with a product from the first method wherein the degree of crosslinking in that first method product is equal to or greater than that required to produce a thermoset material.

As just described, the first method can be performed in at least one of two very different types of equipment. The heated extruder has an inlet hopper for continuous feed, a heated shell for raising the temperature of the polymer being processed, and a motor driven shaft with a variety of screw-type projections for moving melted polymer, under substantial pressure, down the shaft to an outlet. For the first method, the extruder outlet may be left open at the outlet or a restricting orifice may be attached to shape the extrudate. The extruder generates substantial pressure on the crosslinking polymers in the heated shell, but the pressure is generally kept below about 100–400 psia.

In contrast, the thermokinetic mixer is a batch processing equipment. Polymer is located in a chamber where a shaft with generally dull, widely spaced projections spins at speeds preferably over 4,000 rpm, shearing and fracturing pieces of polymer and impinging them on the inside wall of the chamber with projection tip speeds in the range of 150 feet per second. For the first method of the present invention, the thermokinetic mixer raises the temperature of the polymers from ambient to as high as 620° F. in 20–25 seconds or less. The molten batch is then released from the chamber of the thermokinetic mixer, preferably into a mold for compression molding into a block or into a sheet by calendaring for further processing. Extremely short thermosetting times for the first method are obtained in this manner. Although post-release pressure treatment by compression molding or calendaring is the preferred and best method for the first method using a thermokinetic mixer, a material with useful qualities may be made without such post-release pressure treatment.

The first method produces a thermoset product in a manner not disclosed in the prior art. No heated extrusion or thermokinetic mixer process in the prior art describes making a thermoset product from mainly thermoplastic polymers. The thermosetting process of the first method is probably substantially different in the heated extruder and the thermokinetic mixer. The heating, mixing and shear thinning of melted and fractionally melted thermoplastic polymers in the heated extruder crosslink to the point of being thermoset over a period of up to about 90 seconds in a manner relatively slow compared to that of the thermokinetic mixer. The heated extruder uses increasing mechanical pressure to slowly draw out and perhaps break covalent bonds in large molecules for a thermosetting reaction enhanced by physical pressure blending.

In contrast, the thermokinetic mixer generates heat very quickly from (i) impingement of the polymers on the inside of the chamber and (ii) exothermic shearing of covalent bonds in the polymers. In prior art operation, thermokinetic mixers have not been used for indiscriminately breaking and shearing polymers processed because of lack of control of product quality. According to the first method with a thermokinetic mixer, there is little shear thinning from constant pressure as compared with impact shearing of the molecules. For the first method with a thermokinetic mixer, relatively large pieces of mainly thermoplastic polymers are fed to the thermokinetic mixing chamber to effect short, high temperature exposure of sheared polymer bonds so that the crosslinking reaction is completed with low amounts of crosslinking agent. Polymer molecules that would not tend to bond or even blend with other polymer molecules will be indiscriminately shorn into free radicals at high temperatures and intimately melt blended with other polymer molecules likewise generating free radical ends. Such mixing requires extremely low amounts of crosslinking agent.

It has been a further development of the first method that up to 75 weight percent of fibrous non-polymers, in the form of fibers from paper, wood, and natural fiber fabrics and lesser amounts of non-polymer, non-fiber material such as glass, metal, sand, ashes and earth in municipal and industrial waste can be combined advantageously in the heated extruder and/or the thermokinetic mixer to form a thermoset product with surprising usefulness in the process of the second method. The effectiveness of the thermosetting reaction with low amounts of crosslinking agent is not compromised with the extreme dilution of the reactants with the non-polymers or non-polymer, non-fiber materials. The fibrous non-polymers and/or non-polymer, non-fiber material is effectively blended to make a material which is homogenous to close visual inspection. It is preferable to process the polymers and the fibrous non-polymers to be used in the first method in a chipper and "densifier" (a device with fixed blades and spinning blades opposed to mix and chop polymers and fibrous materials).

The present invention will now be discussed with reference to the second method. The second method may also be performed in a heated extruder or, preferably, a thermokinetic mixer. The thermoset product of the first method is allowed to cool and is then chipped into small pieces, preferably about 0.25–0.5 inches across. If the second method is to be carried out in the thermokinetic mixer, it has been surprisingly been found that the thermoset pieces of the first method material may be as large as one (1) inch across for second method processing.

When in the second method a heated extruder will be used for processing the material of the first method, that first method material must first be pulverized to at least about 35 mesh, and preferably to 100 mesh or finer. The requirement of pulverizing to such fine particle size is an additional cost, particularly more expensive and difficult with the addition of high levels of fibrous material to the first method material, and especially almost prohibitive when the first method material contains sand, glass, metal, etc. The pulverized first method material is preferably added to small pellets or flakes of thermoplastic polyolefin and extruded in the heated extruder. An effective thermoplastic polyolefin for use in the second method in a heated extruder is a reclaimed or pre-processed high density polyethylene with a fractional melt or low melt index. Mixed, reclaimed blow molded products are a common source for that high density polyethylene. Upon heated extrusion, the melt blended material may be used in injection, compression or blow molding and extrusion, calendaring or other appropriate processing. Using a heated extruder for the second method contains an inherent limitation on the amount of first method material that can be melt blended for product use. It has been found that the addition of thermoset material to the thermoplastic polyolefin in a melt blend increases the viscosity of the melt blend such that no more than about 40 weight percent of melt blend can be thermoset material without encountering significant processing problems. Use of the pulverized first method material in rotomolded products is also limited to about 40 weight percent for the same reason, i.e., that the flowability necessary for polymers for producing rotomolded products is impaired by high thermoset content. It is not disclosed in the prior art that such a limitation would be encountered, nor a method for preparing a melt blend to avoid that limitation.

Although the preceding limitations of the amount of pulverized first method material in the second method product are significant, the second method product qualities are in some respects similar to or, in some cases, slightly better than the properties of the predominant thermoplastic polyolefin used in the melt blend when using the pulverized first method material up to the above limitations. The present inventor has, however, found an improvement in the second method that permits up to about 75 weight percent of the first method material in a melt blend with the thermoplastic polymer for a second method product by use of the thermokinetic mixer.

The chipped first method material need not be pulverized at all when a thermokinetic mixer is used in the second method. Up to about 75 weight percent chipped or roughly chopped first method material is combined with the same type of small flakes or pellets of the thermoplastic polyolefin described above for the second method for batch processing in the thermokinetic mixer. With that mixture, the batch release temperature of the thermokinetic mixer is preferably from 350–620° F., more preferably from about 420–480° F., usually achieved in less than about 20 seconds at a thermokinetic mixer speed of from about 4000–7000 rpm, more preferably from about 4500–6500 rpm. It has been unexpected that very high processing temperatures (about 550° F. to 620° F.) would make a useful product in the second method.

It is important at this point to explain some basic operation details of the thermokinetic mixers. The batch of material to be processed is placed in the chamber at atmospheric pressure so that about less than half of the mixer chamber is filled with the batch of material. Access to the chamber is made through a hopper at the top of the chamber or screw conveyer at the side of the chamber. The chamber is not gas tight with respect to the outside of the chamber. The shaft and projections start rotating at high speed, forcing polymer particles to impinge on the chamber wall. The heat generated from that action quickly heats the polymer material to a desired processing temperature, at which time a bottom hatch door is opened and the material drops out for further processing. In the case of the second method, the melt-blended material with high content of first method material (greater than 40 weight percent) can be compression molded, extruded or calendared into objects such as wheels, roofing tiles, structural building members, subflooring sheets and other objects where structural strength, water resistance, high temperature strength and low temperature performance might be required. It has been preferable to use a heated or unheated mold for compression molding at pressures greater than about 5,000 psia.

A further unexpected property of the products of the second method has been the discovery of a compression molded product with a paintable surface. When a second method product made with first method material with about more than 25 weight, but preferably 50–75 weight percent fibrous material is compression molded at relatively low pressure (about 5,000 psia) in an unheated mold, the molded parts have significant structural strength, but the surface is not smooth. The surface of the product has, to a depth of about 1–2 mm, a uniform, very soft fiber field of projections making a "fuzz" or "carpet" which is only partly removable with abrasion or sanding. The inherent strength of the attachment of the soft fiber projections make a superior surface for paint which will cover and depress the projections, making a smooth paintable surface.

Sufficient interfacial bonding occurs through chemical, physical, and/or polyblend bonding between the pulverized or chipped first method material and the thermoplastic polymer used in the second method to form a product with structural integrity for many applications. The additional advantage inherent in using the thermokinetic mixer in the present invention for relatively high amounts of first method material in the second method product is that bond breaking and free radical generation at short melt processing times enhance the interfacial bonding from thermoset boundaries to thermoplastic boundaries.

DETAILED DESCRIPTION OF THE INVENTION

As used herein, the term "first method" will refer to a method for effective, homogenizing thermosetting of a wide range polymer blend with or without fibrous or other non-polymer material to make a first method material whose melt index is zero. The term "the second method" will refer to a method to further process the first method material and/or a thermoset polyolefin waste material with thermoplastic polyolefin(s), preferably polyethylene, to make a useful polymer material.

The first method is now described in more detail. The first method of the present invention is advantageous in recycling and recovering reclaimed or pre-processed polymers and fibrous waste when the first method raw material contains dissimilar polymer resins, such as polyethylene and polyvinyl chloride, noted in Wallace '616 as being very difficult to compatiblize or blend. Representative examples of such dissimilar polymer resins will later be presented, but such examples are not absolute limits to the scope of the present invention. It is well established that later developments in an art may fall within the scope of an earlier invention. In the art of polymer resin development, such later developments are made with great rapidity and depth.

The scope of the present invention includes not only the anticipation that new formulations of polymer resins will be made. The present invention has such broad application in effective, homogenizing thermosetting and compatiblizing of mainly thermoplastic polymer blends that the present invention can continue to provide polymer products for many generations of such new formulations.

Table 3, on page 46 of MPE '92, shows the 1990 European production of 11 types polymer resins and how much of each polymer resin was produced for each of 13 product categories. Such groupings are helpful in identifying polymers according to the significant functional groups located on the repeating polymer units. As such classes are described below to define the range of polymers used in the present invention, it is intended that a specific polymer may be classified by its predominant functional groups. Because the first method is a thermosetting process, classification of polymers used in the first method especially relate to functional groups that will affect crosslinking under the conditions of the first method.

As a current review of polymers that could be encountered in a reclaimed or pre-processed material to be processed by the first method, Modern Plastics Encyclopedia (R. Juran, ed., Vol. 67, No. 11, October 1990, McGraw-Hill, hereafter referred to as MPE '90) from pages 4–156, describes major types of commercial polymers, processing methods and typical uses. The typical uses stated therein inform the person skilled in recovering polymers from municipal and industrial waste streams whether a polymer from a certain class will tend to become part of the waste stream that they will be handling.

The term "wide range polymer blend" as used herein is the polymer portion of the first method material and is further defined by the following classes and relative weight percents of those classes:

1. At least 50 weight percent thermoplastic polyolefins (PE, PP, PB, copolymers thereof, etc.), organic acid copolymers of polyolefins (EVA, EEA, etc.), and/or substantially non-vulcanized thermoplastic, polyolefin elastomers.
2. 0–50 weight percent thermoset polymers (phenolics, urea-formaldehyde resins, crosslinked polyesters, and rigid polyurethanes) and rubber and substantially vulcanized elastomers.
3. 0–15 weight percent styrenic resins (polystyrene, ABS, etc.).
4. 0–10 weight percent chlorinated polyolefins (PVC, etc.)
5. 0–25 weight percent amine resins (polyamides, polyimides, acrylonitriles, etc.) 6. 0–25 weight percent aromatic acid resins (polyesters, polycarbonates, polyacetals, polyarylates, etc.)

or 1a. 0–25 weight percent thermoplastic polyolefins (PE, PP, PB, copolymers thereof, etc.), organic acid copolymers of polyolefins (EVA, EEA, etc.), and/or substantially non-vulcanized thermoplastic, polyolefin elastomers.

2a. 75–100 weight percent or less thermoset polyolefins (PE, PP, PB, copolymers thereof, etc.).

These materials are retrieved primarily from recycling facilities and other solid waste streams. Although it is preferable for ease of recovery to use only the polymer portion that may be floated from the bulk solid waste with water (limiting the density of the materials to less than that of water), it is clear from the above list that higher density polymers may also be part of a wide range polymer blend. Homogenous polymers, copolymers and physical blend or "alloy" type polymers not specifically named in the above list are included in the definition of wide range polymer blend by reference to their functional groups and properties, i.e., melt blend index, density, etc. most closely matching those properties to those of the above listed classes. Product type, i.e., bags, bottles, cups, etc., is also a useful factor in determining into which class a specific polymer should be put. Polyethylene (in any of its forms, i.e. LLDPE, LDPE, or HDPE and the range of copolymers with PP) is the preferred thermoplastic polyolefin in the class 1 shown above. An elastomeric or other synthetic resin component of the wide range blend are those typically miscible with those PE forms just described, i.e. natural rubber, ethylene-propylene elastomer, butyl elastomer, polyisobutylene, styrene-butadiene elastomer, polybutadiene, polybutene, and polyisoprene or polystyrene, polypropylene, chlorinated polyethylene, and sulfochlorinated polyethylene. Although synthetic fibers are not generally described as plastics, the polymers of synthetic fibers are to be included in the above classes for purposes of the objects of the present invention.

For the purposes of describing the compatiblizing of polymers by the first method, the following polymers are generally known to make poor melt blends with the above class 1 polymers: PVC, PS, EPS, PET, ABS, and PUR. Additive and processing enhancement of similar or identical polymer resins can make the products resulting from such treatments sufficiently dissimilar so that melt blending of those products with the thermoplastics or elastomers just described creates a relatively useless material. A useful result of the first method of the present invention is to overcome incompatibility of dissimilar polymer resins and resistance to homogenizing crosslinking to create a material with relatively uniform and predictable thermoset properties.

A wide range polymer blend often results from plastics recovery by crude physical sorting of industrial or municipal waste to separate plastics from heavier materials, such as glass and metallic wastes. Crude sorting by flotation is generally followed in the prior art by additional separation steps to segregate polymer products by relatively narrow polymer type. Removal of currently recyclable polymers results in a waste stream low in thermoplastic polymers. Typically, this thermoplastic-depleted stream is sent to a landfill or otherwise disposed of. A wide range polymer blend can encompass the polymers from a crude separation step as well as the range of unrecovered polymers in the thermoplastic-depleted stream.

A first step in the first method requires size reduction of the polymers for further processing. For the first method performed by heated extrusion means, it is preferable to shred the polymers of the wide range polymer blend to about 0.25–0.125 inches across. A chopper will work on PS cups, PP film and caps, densified PE bags, and other components of the class 1 of wide range polymer blend to yield flakes about 0.25 inches across. For the first method performed by thermokinetic mixer means, polymers of the wide range polymer blend generally need to be shredded or chopped to pieces only less than about one (1) inch across, but the pieces will preferably be about 0.25 inches across. When fibrous non-polymers are to be melt blended into the first method material, the fibrous non-polymers and at least a portion of the size-reduced wide range polymer blend will be preferably processed in a densifier prior processing in a heated extrusion or thermokinetic mixer means, as described above.

A second step of the first method is critical to creating thermoset homogeneity of the extruded product. An extruder is used that includes a heated shell having a frustro-conical internal shape and further includes an internal mandrel rotatable relative to the housing. A restriction orifice plate may optionally be attached to the housing at the exit opening for the extruded material. The plate covers and seals the exit opening and is provided with holes of sufficiently small diameter and number to create back-pressure against which a worm forces the wide range polymer blend. A worm is rotatable with the mandrel and its shape defines pockets within the housing. Successive pockets from entrance to exit of the extruder frustro-conical housing have progressively smaller volumes. The extruder housing is heated so that the wide range polymer blend reaches 450–500° F. before exiting through the housing-mounted plate. The material entering the extruder hopper quickly reaches about 300 degrees F. within the housing and is heated continuously until it is extruded from the housing.

Antioxidant is preferably added with the wide range polymer blend as it is fed to the extruder hopper. A suitable antioxidant is STDP, BHT or the 1076 Ciba-Geigy product can be used. Dosage rate is about 50 grams per 100 pounds of wide range polymer blend entering the extruder hopper. Similar antioxidant dosage is used when the first method is performed in the thermokinetic mixer.

Residence time of the wide range polymer blend within the heated extruder housing is above about 10 seconds, preferably above about 30–45 seconds. A crosslinking agent such as dicumyl peroxide ("Dicup" or "Volcup") or similar crosslinking agent is added to the polymers either at the hopper or at a point effecting a residence time with the polymers and the crosslinking agent of over about 10 seconds. The minimum amount of crosslinking agent used in the first method, whether performed in a heated extruder of thermokinetic mixer, to effect the objects of the present invention is from 0.06 to 0.50 weight percent of the wide range polymer blend. Higher levels of crosslinking agent may be used.

Forcing the wide range polymer blend through the successively smaller pockets of the extruder housing creates frictional heating and shearing of polymer fragments in the intimate presence of dissimilar polymers. It is estimated that the pressure within the extruder reaches at least 100 psia. Intense chemical, physical, and/or polyblending crosslinking is initiated by the conditions within the extruder. The thermosetting process in this step two is alone sufficient to create a material whose melt index is 0 (zero) g/10 min. The amounts of crosslinking agent effective for the first method are equivalent to those used in processes operating at 15,000 psia or above, i.e., for autoclave reactors. Typical crosslinking agents for low pressure applications such as rotomolding require much higher dosages and reaction times to create a thermoset material. The result of processing the wide range polymer blend according to this second step is the first method material. It is believed that thermoplastic regions remain in the material but are surrounded with crosslinks of such high density that the melt index of the first method material is zero.

An unexpected advantage of the first method is improved predictability of the properties of the a mixture of polymers with a wide range of densities. High density (i.e. highly crystalline, thermoplastic) polyolefin resins in the wide range polymer blend become less dense in the first method material. HDPE (density of 0.94–0.962) which is thermoset according to the present invention results in a first method material with a density of about 0.94 or less. Less dense, but more highly branched LDPE (density of 0.92–0.93) thermoset according to the present invention results in a first method material with a density of about 0.925. Mid range material with a density of about 0.93–0.938 becomes a first method material with a density of about 0.93. This homogenizing density effect indicates that thermosetting according to the first method forces the molecules of the highly crystalline HDPE and dense PP and PVC polymers apart but permits maintenance of molecular spacing for the highly branched LDPE and less branched LLDPE. This homogenizing density effect is critical to recycling copolymers and the new generation "alloy" copolymers when the components of such polymers will tend to separate under conditions described for recycling in the prior art. The cooled first method material is useful alone as filler for the process of Wallace '616, which is incorporated herein.

As described above, the first method material may contain up to 75 weight percent fibrous non-polymers. As an example of the composition of the fibrous material and the utility of its inclusion in the first method material, a sample of a municipal waste stream was used from which easily sortable (by human hand) polyolefin polymers had been extracted (i.e., bottles, tubs, cups, etc.). This thermoplastic-depleted stream contained small amounts of metal included addition to at least about 60 weight percent fibrous nonpolymers. This thermoplastic-depleted stream by visual inspection appeared to have the lowest level of class 1 polymers described for a wide range polymer blend, about 50 weight percent. The thermoplastic-depleted with a high level of fibrous non-polymers was processed to make a first method material which later became part of a second method product with significant structural strength.

Also, as described above, the first method material may contain non-fibrous, non-polymer material. This material, when processing first method material in an extruder, should be no more than about 20 weight percent of the first method material if the class 1 polymers are about 100 weight percent of the wide range polymer blend and no fibrous non-polymers are used. The non-fibrous, non-polymer material should be reduced in size to less than about 1–2 mm across, preferably to less than about 0.5 mm. A relatively low amount of this material is preferred for its potentially harmful effect on the extruder.

The first method will now be described with reference to making first method material with a thermokinetic mixer. A wide range polymer blend and, optionally, fibrous non-polymers and/or non-fibrous, non-polymer material, are added to thermokinetics mixer means with a crosslinking agent. The non-fibrous, non-polymer material may be has high as 50 weight percent in the first method material when a thermokinetic mixer is used. Otherwise the components of first method material are the same as those in the description above for the extrusion means processing. The preferred release temperature for first method material from the thermokinetic mixer is at least about 300° F. after a mix cycle of above about 8 seconds. The released, thermoset material obtained is then compressed to less than 1,000 psia, preferably to about 100 psia for about 4 to 5 minutes in an unheated or heated mold. The molded material is cooled and chipped or shredded preferably forming pieces from 0.25–0.50 inches across, although pieces as large as one (1) inch across are acceptable for further processing by the second method in a thermokinetic mixer. The molding step, although a preferred best mode, is not necessary to achieve the objects of the present invention.

The second method of the present invention makes use of the product created by the first method. This second method uses first method material or waste thermoset polyolefins (such as wire and cable coverings and roto-molding products) melt blended with a thermoplastic polyolefin to make a polymer product. When the second method is to be performed in a heated extrusion means, first method or waste thermoset material must be pulverized and comprise no more than about 40 weight percent of the second method product. When the second method is to be performed in a thermokinetic mixing means, first method or waste thermoset material may be pulverized but is preferably only chopped in pieces less than one (1) inch across and may comprise up to 75 weight percent of the second method product. The second method is now further disclosed relating to those two processing means.

When the second method is to be performed in a heated extrusion means, a pulverizer of the type obtained from companies such as Wedco, Paulman, or Herbolt is used to pulverize (particulate) the first method material or waste thermoset material into fragments from 20 to 200 mesh. This fracturing of the first method material does not follow grain lines between local concentrations of the various components of the wide range polymer blend. To the contrary, pulverizing or chipping causes fracturing independent of those local concentrations of dissimilar components.

The pulverized first method or waste thermoset material is mixed with thermoplastic polyolefin, preferably a reclaimed or pre-processed mixture of HDPE's which is similarly shredded or chopped as for wide range polymer blend material for the first method, and added to the hopper of a heated extruder. The heated extruder creates a melt blend within its housing and forces that melt blend from the extruder to different molding operations, i.e. blow molding, injection molding, profile extrusion, compression molding or calendaring. The extruder is heated to cause the extruded product to reach about 475–500 degrees F. To the extent that the thermoplastic components of the second method thermoplastic mixture formed useful articles from the above extrusion processes, the articles formed from the melt blend will have properties similar to those formed from the thermoplastic polyolefin resin. The melt blend product can contain up to 40 weight percent first method material or waste thermoset material and still achieve the objects of the present invention.

The second means for accomplishing the second method uses an ultra-high speed thermokinetic mixing device, such as the one produced by Draiswerke, Inc. and described in their brochure entitled "High Speed Thermokinetic Mixing, Compounding, Fluxing" (thermokinetic mixer). The Draiswerke, Inc. device called the Gelimat® heats thermokinetically through particle impingement against the interior of the mixing chamber, although, as described above, the processing of the first method and second method enhance bond cleavage. Although physical blending of the pulverized first method material and a shredded or chopped thermoplastic polyolefin resin is relatively efficient in heated extrusion means, such blending can be less than complete when standard processing methods are used or untrained personnel perform the blending. Using a device like the Gelimat® or a similar thermokinetic mixer as a combination grinding-mixing-melt blending means for the second method, the chipped first method materials (as about 0.25–0.5 inch flakes) are added to the Gelimat® with shredded or chopped thermoplastic polyolefin resin. Extremely rapid heating and sheer grinding of relatively large particles (0.25–0.5 inches in diameter) of the first method material occurs and enhances melt blending and homogeneity. The melt blend is created in seconds in the devices like the Gelimat® as opposed to requiring substantially longer in a conventional extruder. Several molding operations are then used to make a useful article, i.e. injection molding, profile extrusion, compression molding or calendaring.

An unexpected benefit of the second method product is use of a compatiblized, thermoset mixture of dissimilar components comprising a major portion of the polymer product. Mere mixing of a thermoplastic polyolefin only with non-reactive particles (i.e. glass, etc.) is not contemplated by the second method. The present invention has unexpectedly shown that dissimilar polymers can formed into a thermoset material and made to take on the characteristics of a thermoplastic polyolefin. It is apparent that the thermoset polymers of the first method are taking on the properties of such a thermoplastic polyolefin when such properties are maintained or improved at extremely high levels of first method material in the second method product. Interfacial bonding must have taken place between the thermoset first method particles and second method thermoplastic mixture that was as effective as the interfacial bonding to the thermoplastic polyolefin polymer to itself.

The following working examples of the present invention describe the versatility of the present invention as an effective method for reclaiming plastics from waste streams.

EXAMPLE 1

A heated extruder was used for the first method. A thermokinetic mixer was used for the second method. 25% by weight HDPE milk bottles (in about 0.25–0.50 inch pieces) was combined with 75% by weight first method material of the same size. The first method material was 50% by weight LDPE and HDPE, 25% by weight PP, 8% by weight PVC, 8% by weight PS, and 9% by weight PET. The measurement of relative amounts of polymers is approximate in this and all the examples, a fact of importance for recovered materials. The evaluation of recycled material must be made quickly and with little analysis if the recycling method is to be profitable. Generally, PS is in the form of cups, HDPE in the form of bottles, PP in the form of film and caps, and LDPE in the form of bags and other familiar articles. The plastics recycler can quickly determine by simple examination an appropriate treatment required for the purposes of the present invention. First method material was made with dicumyl peroxide at about 0.25–1.00 weight percent of the material processed for the first method, or more preferably about 0.50 weight percent.

A compression molded article was made from the first method material and the recovered HDPE after melt blending in a thermokinetic mixer. Solid core wheels were made by compression molding (at above about 5,000 psia molding pressure) and used for trash cans (at about above 4 inches in diameter and about above 1 inch in thickness) which must be rolled over rough surfaces with over 150 pounds of material inside the can. The wheels show integrity and durability equal to or higher than those produced with HDPE alone.

EXAMPLE 2

A heated extruder was used for the first and second methods. 60% by weight of thermoplastic polyolefins (comprising 66% by weight LDPE and HDPE and 34% by weight PP) in 0.25 inch pieces and 40% by weight of a pulverized waste thermoset polyethylene in about 100 mesh particles were melt blended and extruded to form a box about 2 feet by 2 feet by 3 feet with a thickness of about 5 mm and used for containment of recovered materials from household trash. The integrity and durability of the box was equal to or slightly higher than one formed from the HDPE in the wide range polymer blend.

EXAMPLE 3

The fundamental compatibilization of the present invention is challenged by real conditions of recycling. Most recovered material is not clean. Plastics are typically used for materials that are liquid, sticky, or corrosive. In this example, the materials in the wide range polymer blend contain measurable amounts of the materials stored in them. The butter tubs still contain some butter or margarine. Soap bottles still contain some liquid soaps, oil containers have small amounts of oil, and so on. These residual materials are typically contaminants and extraneous materials to the recycling process.

A heated extruder was used for the first and second methods. 60% by weight of an unwashed, uncleaned thermoplastic polyolefin (comprising 85% by weight of HDPE, 15% by weight of PP) in 0.25–0.5 inch pieces and 40% by weight of the first method material in Example 1 pulverized to about 100 mesh were melt blended and extruded to form a block 0.75 inches by 5 inches by 5 inches. The block had properties of durability and integrity as high or higher than the HDPE contained in the wide range polymer blend directly added to the extruder.

EXAMPLE 4

A heated extruder was used for the first method. A thermokinetic mixer was used for the second method. 60% by weight of a thermoplastic polyolefin (comprising 34% by weight LDPE as bags, 66% by weight HDPE as bottles) in 0.25–0.5 inch pieces and 40% by weight of the first method material in Example 1 in 0.25–0.5 inch pieces were thermokinetically mixed in a Gelimat® device for 15 seconds at about 6,000 rpm, released and compression molded to form a block 0.75 inches by 5 inches by 5 inches. The block had properties of durability and integrity similar to the HDPE contained in the thermoplastic polyolefin.

The melt blends of the above examples all exhibit high viscosity upon addition of increasing amounts of pulverized or thermokinetically flaked first method material. This viscosity effect demonstrates the compatibilization and improved processability of the melt blend according to the present invention. It can now be appreciated that the narrow application of compatibilizers to specific polymer types may now be expanded to more broadly include the concept of using crosslinked material within the proportions described in the present invention to accomplish such compatibilization.

EXAMPLE 5

Thermoplastic polyolefins consisting of 90–80 weight percent fractional melt HDPE from milk bottles with about 10–20 weight percent HDPE from reclaimed grocery bags were used for the second method in this example. For this example, two different compositions of wide range polymer blends were processed to make separate first method materials and separately combined with the thermoplastic polyolefins to make separate second method products. Each of the two compositions of wide range polymer blend were obtained as a mixture of the polymers with about 75 weight percent or less of fibrous non-polymers and with noticeable amounts of iron, copper and aluminum. The fibrous non-polymers appeared to comprise approximately equal amounts of paper and cellulose fiber.

One of the wide range polymer blends of this example was from a thermoplastic-depleted stream containing a wide range polymer blend with 50 weight percent class 1 polymers, and approximately 10 weight percent each of classes 2–6 polymers. The thermoplastic-depleted stream was obtained from a plastics recycling site. This composition was first densfied to enhance polymer and fibrous non-polymer distribution and was then used in a thermokinetic mixer to make first method material. Approximately 0.5 weight percent dicumyl peroxide was added with the polymers to the thermokinetic mixer based on the weight of the wide range polymer blend being processed. A mixer speed of about 6,000 rpm was used in a thermokinetic mixer, the Gelimat® Model G2.5, at release temperatures of about 390° F. and at cycle times of above about 10 seconds, preferably about 10–15 seconds, from start of shaft spinning until melt blend release. The released first method material was compressed into a unheated mold at over 100 psia for approximately 5 minutes to form a block about 6 inches square and about 0.75 inches thick. The block was then cooled and chipped to pieces approximately 0.25 to 0.50 inches across.

A second wide range polymer blend was obtained by combining with the densified thermoplastic-depleted stream of the above paragraph an amount of thermoplastic polyolefins in the weight ratio of about 95:5 thermoplastic-depleted stream polymers to thermoplastic polyolefins (hereafter referred to as enriched thermoplastic-depleted stream). The effect was to slightly increase the crosslinkable thermoplastics in the wide range polymer blend from the thermoplastic-depleted stream. First method material was made from that enriched mixture in a heated extruder. The residence time of the wide range polymer blend and a crosslinking agent in the shell-heated extruder was about 45 seconds. The extruder inlet temperature was 300° F., the extruder outlet temperature was about 475° F., and the crosslinking agent, dicumyl peroxide, was added at the inlet hopper for the extruder at about 0.25 weight percent based on the weight of the wide range polymer blend. The extruder barrel was about 2.5 inches in diameter and was about 6 feet in length from the hopper inlet to the outlet.

First method materials from both of the above compositions were separately chipped forming pieces from about 0.25–0.50 inches across. Thermoplastic polyolefins were then separately added to each of the first method materials to provide a 75:25 weight ratio mixture of first method materials to thermoplastic polyolefins. The resulting mixtures were then processed in the Gelimat® Model G2.5 with first method material at cycle times of from about 10 to 20 seconds, more preferably 13–20 seconds at release temperatures of from 430–480° F. The melt blended material from the thermokinetic mixer was compression molded into blocks about 6 inches by 6 inches by 0.75 inches at about 5,000 psia for 4–5 minutes. The blocks had the following properties:

|  | Enriched Thermoplastic-Depleted Stream / Second Method Product @ 480° F. Release Temperature | Thermoplastic-Depleted Stream / Second Method Product @ 430° F. Release Temperature |
| --- | --- | --- |
| Secant Modulus @ 2% (psi) | 30320 | 64261 |
| Displacement at Yield (z-slp) (in) | 0.121 | 0.111 |
| Stress at Yield (z-slp) (in) | 537.18 | 297.046 |
| Strain at Yield (z-slp) (in) | 0.155 | 0.101 |
| Impact Test Gradient (lb/in) | 6312 | 6270 |

There was a tendency toward improved stress/strain response with material from the thermoplastic-depleted stream having been processed in the thermokinetic mixer, a result that is consistent with proposed improvement in reaction dynamics therein over processing in a heated extruder.

Release temperatures for a second method product were obtained as high as 620° F. with an enriched thermoplastic-depleted stream, first method material and the above thermoplastic polyolefins. The subsequently compression molded block product had substantial structural integrity, although the fiber content was somewhat charred. The present invention has developed a highly heat resistant polymer product, which upon addition of know flame retardants will prove to be a heat and flame resistant structural member building material. In addition, when some shrinkage is observed in the second method product upon cooling, a small amount of blowing agent, such as baking soda, added to the melt blending step of the second method will compensate for such shrinkage.

It will be appreciated by those skilled in the art that specific descriptions of every proportion of every polymer product recovered from solid waste is not required to teach the advantages of the present invention. It will be appreciated that first method material is very useful in transporting and storing feedstock for other processes in an inert, non-degradable form. The present invention permits the recovery and conversion of very low cost, previously not economically processable polymer waste into a useful and marketable product.

I claim:

1. A compatiblizing thermosetting process to form a first method material comprising:

(a) a processing mixture comprising 25 to nearly 100 weight percent of a polymer blend and a small amount of a crosslinking agent sufficient to cause the polymer blend and the processing mixture to become thermoset with a melt index of zero just before the processing mixture is released from a mixing chamber of a mixing means of the process;

(b) the polymer blend comprising at least 50 weight percent of a thermoplastic polyolefins mixture, such thermoplastic polyolefins mixture consisting of substantial amounts of different thermoplastic polyolefins, such different polyolefins having been previously and separately melted for processing or substantial amounts of different thermoplastic polyethylene resins of high and low densities or high and low molecular weights and previously and separately melted for processing;

(c) subjecting the processing mixture to thermokinetic, intensive mixing within a thermokinetic mixing chamber of a thermokinetic mixing means wherein within such chamber the processing mixture rises to at least to the temperature at which the crosslinking agent causes crosslinking in the polymer blend;

(d) maintaining the thermokinetic, intensive mixing of the processing mixture in the thermokinetic mixing chamber until the processing mixture is thermoset and has a melt index of zero, at which time it becomes the first method material incapable of being extruded; and (e) releasing the first method material from the thermokinetic mixing chamber.

2. The process of claim 1 wherein the processing mixture comprising 10 to almost 75 weight percent non-synthetic fibrous materials.

3. The process of claim 1 wherein the polymer blend further comprises about 1 to 15 weight percent of styrenic resins.

4. The process of claim 1 wherein the polymer blend further comprises about 1 to 10 weight percent of chlorinated polyolefins.

5. The process of claim 1 wherein the polymer blend further comprises about 1 to 25 weight percent of amine resins.

6. The process of claim 1 wherein the polymer blend further comprises about 1 to 25 weight percent of aromatic acid resins.

7. The process of claim 1 wherein the polymer blend further comprises about 1 to 50 weight percent of thermoset polymers.

8. A compatiblizing thermosetting process to form a first method material comprising:

(a) a processing mixture comprising 25 to nearly 100 weight percent of a polymer blend and a small amount of a crosslinking agent sufficient to cause the polymer blend and the processing mixture to become thermoset with a melt index of zero just before the processing mixture is released from a mixing chamber of mixing means of the process;

(b) the polymer blend comprising at least 50 weight percent of a thermoplastic polyolefins mixture, such thermoplastic polyolefins mixture consisting of substantial amounts of different thermoplastic polyolefins, such different polyolefins having been previously and separately melted for processing or substantial amounts of different thermoplastic polyethlene resins of high and low densities or high and low molecular weights and previously and separately melted for processing;

(c) subjecting the processing mixture to shearing, heated mixing within a tubular barrel mixing chamber of and extruder mixing means wherein within such chamber the processing mixture rises to at least to the temperature at which the crosslinking agent causes crosslinking in the polymer blend;

(d) maintaining the shearing, heated mixing of the processing mixture in the tubular barrel mixing chamber until the processing mixture is thermoset and has a melt index of zero, at which time it becomes the first method material material incapable of being extruded; and (e) forcing the first method material from the tubular barrel mixing chamber.

9. The process of claim 8 wherein the processing mixture comprises 10 to almost 75 weight percent non-synthetic fibrous materials.

10. The process of claim 8 wherein the polymer blend further comprises about 1 to 15 weight percent of styrenic resins.

11. The process of claim 8 wherein the polymer blend further comprises about 1 to 10 weight percent of chlorinated polyolefins.

12. The process of claim 8 wherein the polymer blend further comprises about 1 to 25 weight percent of amine resins.

13. The process of claim 8 wherein the polymer blend further comprises about 1 to 25 weight percent of aromatic acid resins.

14. The process of claim 8 wherein the polymer blend further comprises about 1 to 50 weight percent of thermoset polymers.

* * * * *